US012649163B2

(12) United States Patent
Cuadrado Fernandez

(10) Patent No.: US 12,649,163 B2
(45) Date of Patent: Jun. 9, 2026

(54) APPARATUS FOR COATING OR ENCAPSULATING ARTICLES

(71) Applicant: ROMACO TECPHARM, S.L., Rubi (ES)

(72) Inventor: Pedro Cuadrado Fernandez, Barcelona (ES)

(73) Assignee: ROMACO TECPHARM, S.L., Rubi (ES)

( * ) Notice: Subject to any disclaimer, the term of this patent is extended or adjusted under 35 U.S.C. 154(b) by 217 days.

(21) Appl. No.: 17/997,188

(22) PCT Filed: Apr. 21, 2021

(86) PCT No.: PCT/ES2021/070266
§ 371 (c)(1),
(2) Date: Oct. 26, 2022

(87) PCT Pub. No.: WO2021/219911
PCT Pub. Date: Nov. 4, 2021

(65) Prior Publication Data
US 2023/0338979 A1      Oct. 26, 2023

(30) Foreign Application Priority Data

Apr. 28, 2020    (EP) .................................... 20382347

(51) Int. Cl.
A23G 3/26      (2006.01)
A23G 3/34      (2006.01)
(Continued)

(52) U.S. Cl.
CPC ........ B05B 13/0257 (2013.01); A23G 3/0095 (2013.01); A23G 3/26 (2013.01);
(Continued)

(58) Field of Classification Search
None
See application file for complete search history.

(56) References Cited

U.S. PATENT DOCUMENTS 4,064,831 A * 12/1977 Okawara .................. A23G 3/26
                                                        23/313 R
4,310,562 A * 1/1982 Melliger .................. B01J 2/006
                                                        427/2.2
(Continued)

FOREIGN PATENT DOCUMENTS

EP        1 200 197 B1      8/2005
EP        2 289 614 A1      3/2011
(Continued)

OTHER PUBLICATIONS

International Search Report for PCT/ES2021/070266 dated Jul. 21, 2021.
(Continued)

*Primary Examiner* — Binu Thomas
(74) *Attorney, Agent, or Firm* — Sughrue Mion, PLLC

(57) ABSTRACT

An apparatus for coating or encapsulating articles, having a drum with a perforated wall rotatably assembled in a wrap-around chamber and suitable for containing and stirring a batch of articles to be coated; a dispenser group with one or more nozzles for spraying a coating product; a gas inlet to direct clean drying gas against the perforated wall and a gas outlet to extract from the chamber dirty drying gas. An adjustable closure system is interposed between the drum and the gas outlet of the chamber, defining a passage for the dirty drying gas smaller than the passage by the gas outlet and further displaced or concentrated coinciding with the area of the wall of the drum that is effectively covered by the batch of articles. An automated adjustment of the locking system is envisaged, taking into account the position of the nozzles within the drum.

15 Claims, 5 Drawing Sheets

(51) Int. Cl.

| | |
|---|---|
| *A23P 20/18* | (2016.01) |
| *A61J 3/00* | (2006.01) |
| *B01J 2/00* | (2006.01) |
| *B01J 2/12* | (2006.01) |
| *B05B 12/12* | (2006.01) |
| *B05B 13/02* | (2006.01) |
| *B05B 15/68* | (2018.01) |

(52) U.S. Cl.
CPC .............. *A23P 20/18* (2016.08); *A61J 3/005* (2013.01); *B01J 2/006* (2013.01); *B01J 2/12* (2013.01); *B05B 12/124* (2013.01); *B05B 15/68* (2018.02)

(56) References Cited

U.S. PATENT DOCUMENTS

| | | | | |
|---|---|---|---|---|
| 4,476,804 A | * | 10/1984 | Glatt | B05D 1/02 |
| | | | | 118/19 |
| 4,554,887 A | * | 11/1985 | Yoakam | A23G 3/26 |
| | | | | 118/712 |
| 4,639,383 A | | 1/1987 | Casey | |
| 5,494,709 A | | 2/1996 | Long, Jr. et al. | |
| 5,495,418 A | * | 2/1996 | Latini | A23G 3/26 |
| | | | | 118/19 |

| | | | | |
|---|---|---|---|---|
| 5,531,826 A | * | 7/1996 | Fusejima | A23G 3/26 |
| | | | | 118/19 |
| 2002/0117108 A1 | * | 8/2002 | Pentecost | B01J 2/12 |
| | | | | 118/303 |
| 2004/0250757 A1 | | 12/2004 | Natsuyama et al. | |
| 2006/0096527 A1 | * | 5/2006 | Hasegawa | B05B 13/0257 |
| | | | | 118/19 |

FOREIGN PATENT DOCUMENTS

| | | | | |
|---|---|---|---|---|
| EP | 3597048 A1 | * | 1/2020 | .............. A23G 3/26 |
| ES | 1 232 314 U | | 7/2019 | |
| JP | 56-91176 A | | 7/1981 | |
| JP | 56-100623 A | | 8/1981 | |
| JP | 63-74132 U | | 5/1988 | |
| JP | 2003-62500 A | | 3/2003 | |
| JP | 2003-225599 A | | 8/2003 | |
| WO | 2010/071964 A1 | | 7/2010 | |
| WO | 2016/168180 A1 | | 10/2016 | |

OTHER PUBLICATIONS

Written Opinion for PCT/ES2021/070266 dated Jul. 21, 2021.
European Search Report for EP 20 38 2347 dated Oct. 12, 2020.

* cited by examiner

APPARATUS FOR COATING OR ENCAPSULATING ARTICLES

CROSS REFERENCE TO RELATED APPLICATIONS

This application is a National Stage of International Application No. PCT/ES2021/070266 filed Apr. 21, 2021, claiming priority based on Spanish Patent Application No. 20382347.1 filed Apr. 28, 2020.

TECHNICAL FIELD OF THE INVENTION

The present invention relates to an apparatus for coating or encapsulating articles of the type comprising a rotating drum intended for stirring a batch of articles to be coated with a certain product which is sprayed through at least one nozzle placed inside the drum. These apparatuses are used, for example, for coating granular articles, such as in the form of tablets or pills, common in pharmaceutical and confectionery products.

BACKGROUND OF THE INVENTION

The use of apparatuses for coating or encapsulating is widely spread in the pharmaceutical sector for applying an outer layer of one or several products over granular articles, for example, in the form of tablets or pills.

In essence, these apparatuses comprise a container within which a drum is rotated containing a production batch of the articles to be coated. Typically, the apparatuses are equipped with one or several spraying nozzles of the product to be used to coat said articles. This spraying operation is performed while the drum rotates and stirs the batch of articles to ensure a homogeneous coating in all the articles. Also conventionally, the drum is perforated and the coating apparatus comprises a circuit of forced gas, generally air, which passes through the drum helping the sprayed product to dry once applied on the articles to be coated.

The purpose of these apparatuses is the application of a coating of predetermined thickness to a specific batch of articles, the coating generally measured in terms of weight gain, in the most efficient way possible, that is with minimal operation time and consuming the right amount of coating product.

The distance between the nozzles and the free surface of the articles to be coated is a factor that has proven key to ensuring a correct and efficient coating. However, this distance is not the only parameter intervening when searching for an optimal coating. Other factors such as the direction of the sprayed product jet also play an important role, directing the jet in a direction essentially normal to the free surface of the batch of articles to be coated being of special interest.

The apparatuses with fixed nozzles cannot adapt to these requirements and therefore, can only operate efficiently for batches of very specific articles.

Indeed, the smaller the batch of articles to be coated, the greater the distance between the free surface of said articles stirred inside the drum and the spray nozzles will be, preventing the apparatuses with fixed nozzles especially suitable for large batches from being used for smaller batches or vice versa.

Likewise, it may be the case that for the same batch of articles different distances are required between the free surface of the articles and the nozzles if, for example, the properties of the product with which the articles are to be coated change.

With the purpose of offering more versatile apparatuses, coating apparatuses with movable spray nozzles have been disclosed, able to adopt different spatial positions and in some cases, also vary the orientation thereof to adapt to the batch of articles and/or to the product to be used for coating thereof.

Patent document JP2003062500 describes a coating apparatus that assembles a positioning group of a series of nozzles. This positioning group has only one degree of freedom, the nozzles being able to move only vertically to approach or move away from the bottom of the drum.

Patent document EP1200197 describes one alternative to the aforementioned apparatus wherein it is further possible to move the nozzles closer to or away from the wall of the drum. It is worth noting that the positioning mechanism of the nozzles is controlled by a sensor which detects in real time the distance between a measurement point and the free surface of the batch of articles stirred within the drum.

Patent document EP 3597048 describes an improved coating apparatus, with movable spray nozzles by means of a mechanism which causes the nozzles to simultaneously move closer to or away from the free surface of the batch of articles inside the drum and a change in the angular position thereof, to keep them essentially perpendicular to said free surface. The apparatus can be equipped with a sensor of the ultrasound type able to measure the instant distance between a measurement point and the free surface of the batch of articles inside the drum to automatically correct the distance between the nozzles and the batch of articles, adjusting it to a target value.

Needless to say, being able to arrange the nozzles at the optimal distance from the batch of articles inside the drum helps to increase the efficiency of the operation of the same apparatus, when this is operated with different batch sizes, with respect to apparatuses in which the spray nozzles are fixed. Depending on the batch size and the nature of both the articles to be coated and the product or products to be used in the coating, there will be optimal recipe parameters which may comprise, in addition to the batch size and the time of operation, the rotation speed of the drum and the flow and/or pressure of the product or products to be sprayed, and now also a selected position for the spray nozzles inside the drum.

However, and despite the above, the improvement in efficiency is not, in practice, as great as expected.

Therefore, an object of the present invention is an apparatus and a method for coating or encapsulating articles that improves even more the efficiency of the coating operation, and especially that improves the efficiency of the apparatuses that have means to arrange the spray nozzles in a selected position inside the drum and according to recipe parameters.

DESCRIPTION OF THE INVENTION

In order to promote that the product sprayed in the direction of the batch of articles inside the drum is properly applied on said articles, ensuring measures so that the gas passing through the drum follows a preferred direction, specifically so that it passes through the batch of articles contained in the drum, is known.

In order to do this, the drum is arranged rotatably assembled in a wrap-around chamber with one gas inlet to the chamber on a first side of the drum to direct clean drying gas against the perforated wall of the drum and at least one gas outlet from the chamber on the other side of the drum to extract from the chamber dirty drying gas that has passed through the drum. During the rotation of the drum, the batch of articles accumulates at the bottom of the drum, but slightly displaced to one side of the same. In order to ensure that the gas follows a preferred direction, the gas outlet of the chamber is located coinciding with the drum area where the batch of articles accumulates to force the gas to pass through the batch of articles.

Even when the apparatus exhibits movable nozzles and these can move closer to the batch of articles when the apparatus is operated with small batches to search for the best spraying conditions and minimise product losses, it may be that the batch of articles is arranged on the perforated wall of the drum in a different way and especially that the articles are distributed such that they cover a smaller surface of the perforated wall of the drum compared to larger batches of articles.

This results in gas flow escaping from the drum through the perforated wall thereof to areas not effectively covered by the articles. This effect takes place even when the spray nozzles have been arranged in the best possible position with respect to the free surface of the articles inside the drum.

This gas flow carries coating product with it without it being deposited on the articles; it causes the perforated wall of the drum to be sprayed and not the articles themselves; it causes losses of useful product; it causes dirt in the gas piping ducts downstream of the wrap-around chamber; and it causes deterioration of the cleaning filters conventionally used for gas cleaning. Obviously, all this is to the detriment of the efficiency of the coating operation.

The present invention proposes an apparatus with an adjustable closure system interposed between the drum and the gas outlet of the wrap-around chamber, capable of defining an effective passage for the dirty drying gas smaller than the passage offered by the gas outlet of the chamber and further displaced or concentrated coinciding with the area of the wall of the drum that is actually covered by the batch of articles, all of this according to claim 1.

In a variant, the apparatus comprises a controller which operates the closure system for at least automatically adjusting the status thereof or triggering a recommendation signal, if the status of the closure system or the concordance with the area of the wall of the drum that is effectively covered by the batch of articles is not optimal. With this measure, the adjustment of the closure system or the corresponding warning or warnings to make the operator aware that the effective gas outlet is not optimal according to a size of a batch of articles is automated.

In a variant, the apparatus takes further advantage of the already known relationship between the size of the batch, which ultimately will determine the area of the wall of the drum which is covered by the batch of articles, and the position of the spray nozzles to automatically adjust the status of the closure system or to generate recommendation signals depending on the position of the spray nozzles in apparatuses with movable nozzles. All of this in favour of the total efficiency of the coating operation.

Within the context of the present invention, position of the nozzle is understood as both the spatial location and the orientation thereof, or a combination of both parameters. The spatial location can be defined, for example, based on a fictitious reference or coordinate axis; based on other components of the apparatus—such as a distance to the wall of the drum—; or based on external elements—such as a distance to the free surface of the batch of articles inside the drum—.

The invention has application in apparatuses in which the dispenser group, more specifically the associated mechanism which enables the nozzle or nozzles to be arranged in the selected position inside the drum according to the recipe parameters, can be actuated manually or in a motorised manner. In both cases, the position of the nozzle or nozzles in the drum for the coating operation will be used to adjust the closure system or to trigger recommendation signals, that is, recommendation of adjustment of the closure system.

The invention contemplates that the operator, following recipe parameters, manually places the nozzle or nozzles in the selected position manoeuvring the associated mechanism which, naturally, can be a mechanism controlled from outside the drum and be a motorised mechanism. The operator will know, following recipe parameters based on, for example, a table of experiments, which one is the optimal position of the nozzle or nozzles depending on the type and size of the batch of articles.

The invention further contemplates that the apparatus has means for the selection of the position of the nozzle or nozzles to be assisted or automated.

Thus, in another variant of the invention, the apparatus is equipped with a sensor which measures the distance $(di)$ between a measurement point and the free surface of the batch of articles contained in the drum, the mechanism of the dispenser group being a motorised mechanism, controlled based on the measurement of the aforementioned sensor, thus equipping the dispenser group with the ability to automatically position the nozzle or nozzles inside the drum at a target distance $(d0)$ with respect to the free surface of the batch of articles which will in turn trigger, by means of the controller, the adjustment, also automatic, of the status of the closure system.

The automatic adjustment of the closure system can further be performed separately or without intervention of the position of the nozzle or nozzles, which makes possible to put the invention into practice even in apparatuses with fixed nozzle or nozzles.

In this sense, in another variant of the invention, the apparatus is equipped with a sensor which measures the distance $(di)$ between a measurement point and the free surface of the batch of articles contained in the drum, and the size of the area of the wall of the drum that is effectively covered by the batch of articles is estimated based on the measurement of the aforementioned sensor without taking into account the position of the nozzle or nozzles.

As far as the closure system is concerned, this can comprise a single movable gate or a set of gates with several movable gates, the single movable gate or the movable gates being actuatable by a respective actuator, controllable by the controller.

The gas outlet is located on one side of the drum, covering a portion of the perforated wall thereof which extends to the bottom or near the bottom of said drum.

In an embodiment, the apparatus comprises, downstream of the chamber enclosing the drum, a drying gas suction group, capable of providing vacuum conditions in the chamber and consequently promoting a flow of dirty drying gas in one outlet direction (L) of the chamber; and the closure system has several gates placed across the passage of gas from the chamber gas outlet, superimposed and configured in the form of blades which, like a slatted shutter, are rotatably assembled around respective rotation axes essentially normal to the direction (L), with more than one gate being actuatable by means of the controller between at least one open position (A), wherein the blade is arranged essentially parallel to the direction (L), and a closed position (B), wherein the blade is essentially normal to the direction (L), so that a cascade arrangement of these gates from the open position (A) thereof to the closed position (B) thereof, starting with the one at the highest level and continuing with the one immediately below, causes a gradual reduction in the passage of gas and the concentration thereof towards lower positions of the perforated wall of the drum.

It is convenient that, in the open position (A), the lower edge of the blades of the movable gates fits over the perforated wall of the drum.

It is convenient that, in the closed position (B), the upper and lower edge of the blades of the actuatable gates fit over the respective adjacent frames or gates in an essentially airtight manner.

However, an object of the invention is also a method for coating or encapsulating articles, comprising forcing the passage of a gas flow through a chamber and a rotating drum with a perforated wall, enclosed in said chamber, which contains and stirs a batch of the articles to be coated while a coating product is projected from inside the drum over said articles by means of at least one nozzle, the method comprising the action of concentrating the effective passage of outlet gas flow from the chamber coinciding with that area of the wall of the drum which is effectively covered by the batch of articles.

In a variant of the method, the drum being enclosed in a wrap-around chamber with at least one gas inlet to the chamber on a first side of the drum to direct clean drying gas against the perforated wall of the drum and at least one gas outlet from the chamber to the other side of the drum, adjacent to the perforated wall to extract from the chamber dirty drying gas that has passed through the drum, the method comprises automatically operating an adjustable closure system interposed between the drum and the gas outlet of the chamber, capable of defining an effective passage for the dirty drying gas smaller than the passage offered by the gas outlet of the chamber and further displaced or concentrated coinciding with the area of the wall of the drum that is effectively covered by the batch of articles.

The size of the area of the wall of the drum that is effectively covered by the batch of articles can be estimated based on the measurement of the distance between a measurement point and the free surface of the batch of articles contained in the drum or based on the position of the nozzle or nozzles inside the drum if these are movable nozzles. In this last case, the position of the nozzle or nozzles will have been selected either manually—following recipe parameters comprising, at least, the size of the batch of articles—or with the assistance of a measurement of the distance between a measuring point and the free surface of the batch of articles contained in the drum.

DETAILED DESCRIPTION OF AN EMBODIMENT

Figures 1, 2:
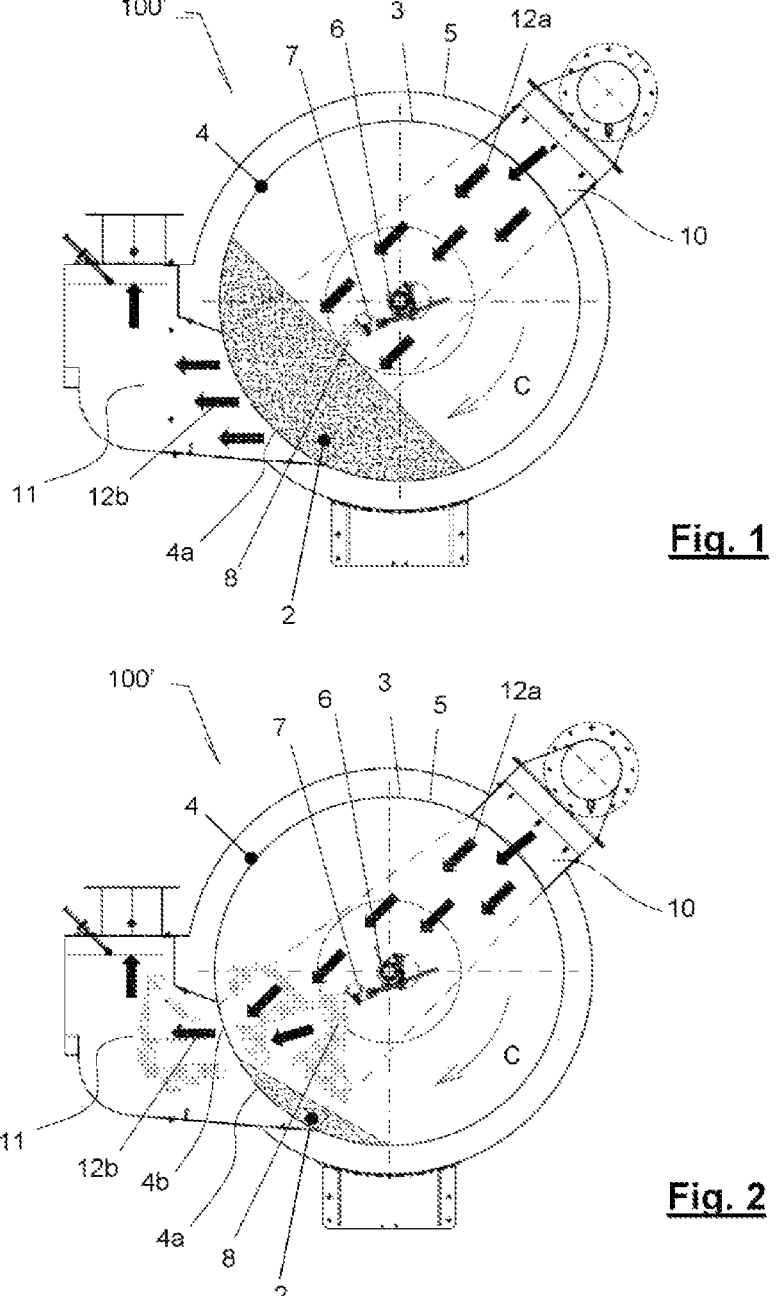
FIGS. 1 and 2 schematically show two operational situations in the same conventional apparatus for coating or encapsulating articles, operating with different sizes of batches of articles to be coated.

FIGS. 1 and 2 intend to schematically illustrate a apparatus 100' of the type known for the manufacture of tablets, specifically for coating granular medicinal articles 2 with a coating product 8. The apparatus 100' comprises a drum 3 with a perforated wall 4 rotatably assembled in a wrap-around chamber 5, the drum 3 being suitable for containing and stirring a batch of articles 2 to be coated during the rotation of the drum. To that end, the drum 3 is provided in a known manner with a series of blades, flaps or similar (not depicted) which collect a portion of the batch of articles and lift it to drop it when the blades reach a certain placement during the rotation of the drum 3, in the example in the direction indicated by the arrow C.

The apparatus 100' comprises a dispenser group 6 with several nozzles 7 to spray a coating product 8 on the articles contained in the drum 3 according to recipe parameters.

The chamber 5 has a gas inlet 10 to the chamber 5 located on a first side of the drum 3 to direct clean drying gas 12a against the perforated wall 4 of the drum and a gas outlet 11 on the other side of the drum, adjacent to the perforated wall 4 of the drum 3, to extract from chamber 5 the dirty drying gas 12b which has passed through the drum 3.

FIGS. 1 and 2 come to show that different sizes of batches of articles 2 to be coated are distributed in a different way in the drum 3. More specifically, FIG. 1 intends to illustrate that when the apparatus 100' operates at maximum capacity, the arrangement and configuration of the gas outlet 11 of the chamber 5 ensures that substantially all the dirty drying gas 12b extracted from chamber 5 has been forced to pass through the batch of articles 2. However, when the same apparatus 100' operates with a significantly smaller batch of articles 2, see FIG. 2, the area 4a of the perforated wall 4 of the drum 3 effectively covered by the articles 2 is reduced and is displaced slightly towards the bottom of the drum 3, which leaves an uncovered area 4b of the perforated wall 4 facing the passage of gas offered by the gas outlet 11. Through this uncovered area 4b of the perforated wall 4, dirty gas 12b can exit the drum 3 dragging along product 8 which is not deposited on the batch of articles 2. This stream of dirty gas 12b which exits the drum 3 without passing through the batch of articles 2 undermines the efficiency of the coating operation because, as mentioned above, it causes the perforated wall 4 of the drum 3 to be sprayed, consequently causing losses of useful product, it causes dirt in the gas piping ducts downstream of the wrap-around chamber 5 and it causes deterioration of the cleaning filters conventionally used in the treatment unit of the outlet gas.

Figure 3:
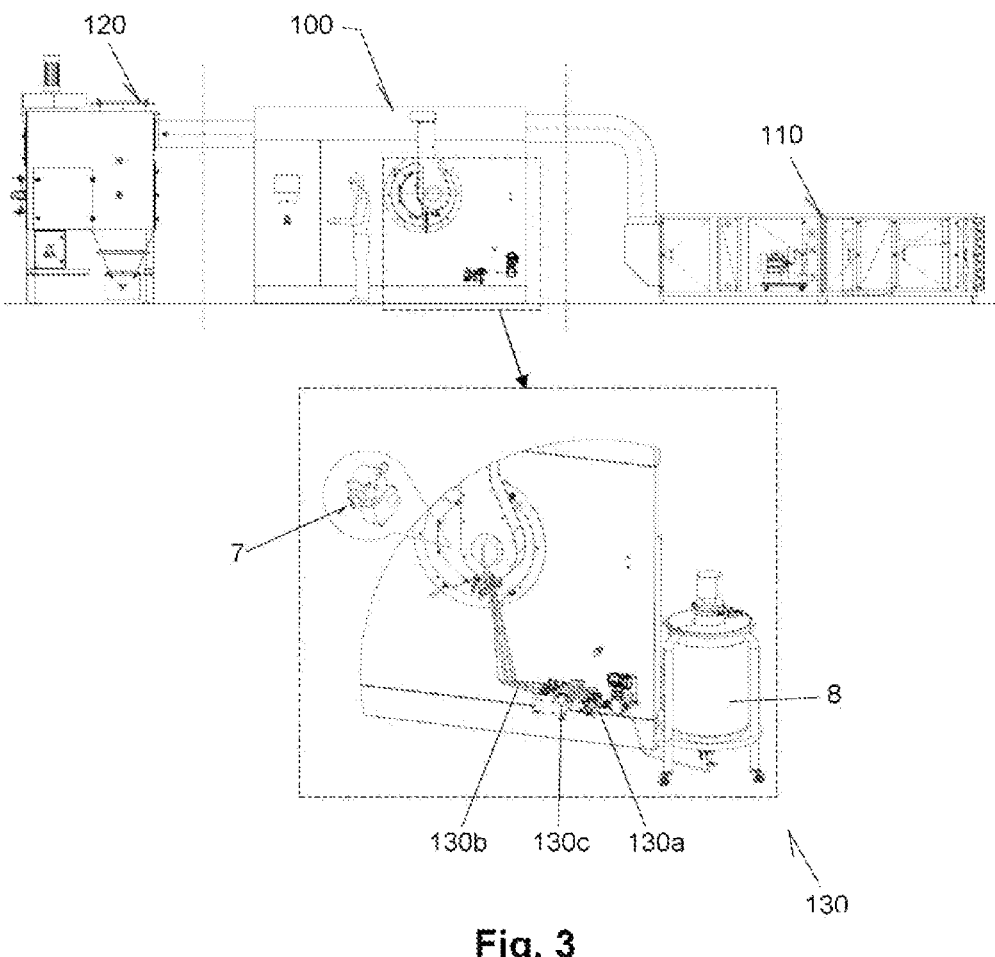
FIG. 3 is a general external view of a typical installation using an apparatus according to the present invention for coating or encapsulating articles.

FIG. 3 shows an installation using an apparatus 100 for coating or encapsulating articles 2 according to the invention. This installation comprises the apparatus 100; a supply unit 110 of gas, such as air, which will be blown into the apparatus 100; a treatment unit 120 of the gas that will exit from the apparatus 100; and a supply unit 130 of the product or products that will be used for coating the articles 2.

The supply unit 130, framed and depicted enlarged in FIG. 3, corresponds to a supply unit such as that described in patent document ES 1232314U, which is equipped with obstruction detection means. In order to do this, it comprises drive means 130*a* of the product 8; and conduits 130*b* which establish fluid connection between the drive means of the product and the injection nozzles 7 (arranged inside the drum) with the particular feature that each conduit 130*b* has a section made up of a flexible sleeve externally clamped by a detector 130*c* which, by means of a load cell resting on the sleeve, converts into a measurable electric signal any increase in pressure which the sleeve may exert on the load cell by the expansion of the sleeve in case of obstruction, in the associated conduit or nozzle, that could undermine the efficiency of the apparatus. Naturally, other supply units, different from the one exemplified here, can be used.

Figure 4:
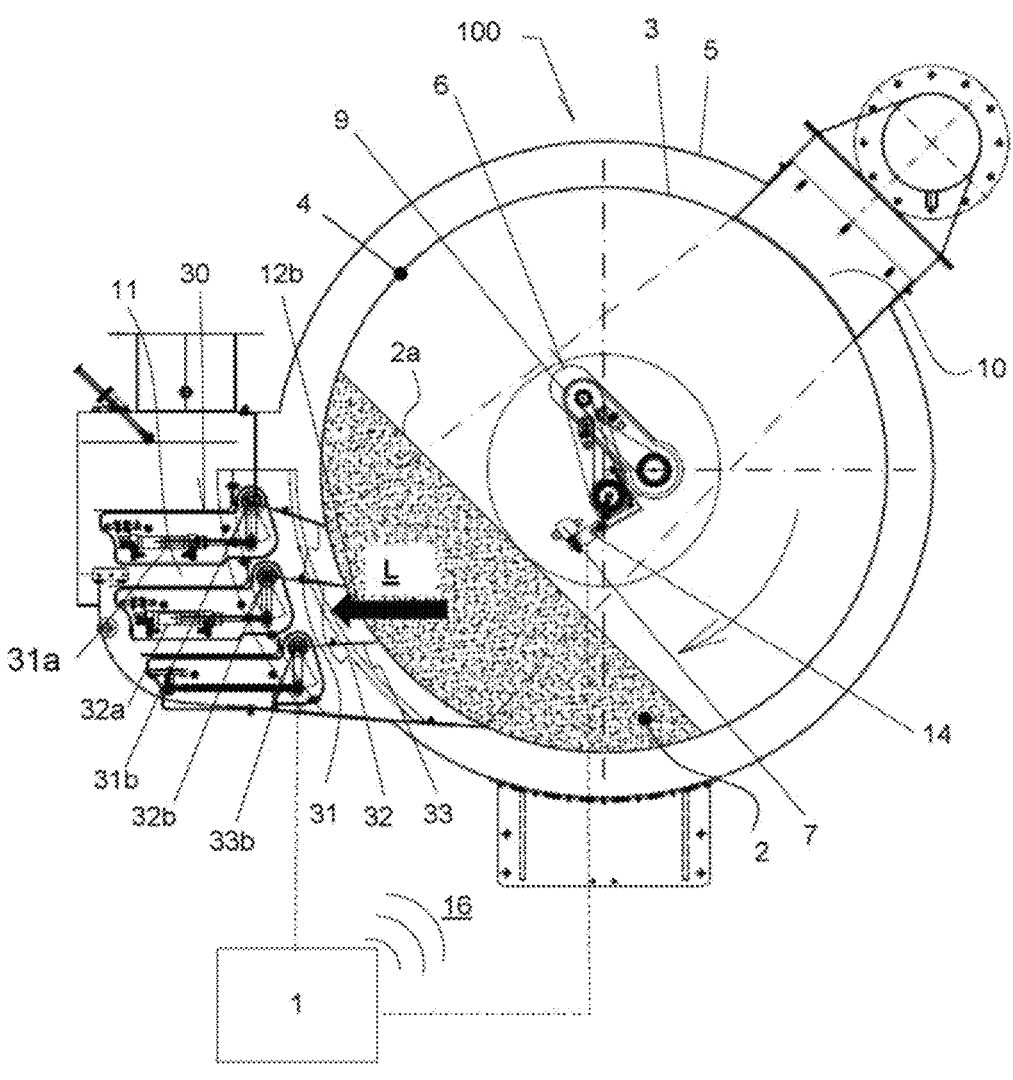
FIG. 4 schematically shows an apparatus according to the present invention.

FIG. 4 schematically shows and exemplifies a variant of the apparatus 100. The apparatus 100, according to the invention, shares some features with the conventional apparatus 100' and identical numerical references will be used to designate these common features of both apparatuses.

A feature of apparatus 100 is that it comprises an adjustable closure system 30 interposed between the drum 3 and the gas outlet 11 of the chamber 5, capable of defining an effective passage for the dirty drying gas 12*b* smaller than the passage offered by the gas outlet 11 of the chamber 5 and not only that but additionally, in the closure system 30 said restricted passage can be concentrated to coincide with the area of the perforated wall 4 of the drum 3 which is in every case covered by the batch of articles 2.

Although not depicted, the apparatus 100 of FIG. 4 comprises, downstream of chamber 5, a drying gas suction group, capable of providing vacuum conditions in the chamber 5 and consequently promoting a flow of dirty drying gas 12*b* in the outlet direction (L) of the chamber 5.

As illustrated in FIG. 4, the locking system 30 of the apparatus 100 comprises a set of three movable gates 31, 32 and 33. The gates 31, 32 and 33 are placed across the passage of gas, superimposed and configured in the form of blades which, as a slatted shutter, are rotatably assembled around respective rotation axes 31*b*, 32*b*, 33*b* essentially normal to the direction (L), each gate 31, 32, 33 being able to move between two end positions: an open position (A), wherein the blade is arranged essentially parallel to the direction (L), adopting in the example in FIG. 4, an approximately horizontal orientation, and a closed position (B), wherein the blade is placed essentially normal to the direction (L), adopting in the example of FIG. 4, an approximately vertical orientation.

In the example, the upper 31 and intermediate 32 gates are further actuatable by means of a respective actuator 31*a*, 32*a*, controllable by a controller 1 with the goal of automatically adjusting the passage of gas through the gas outlet 11, as will be explained below. The lower gate 33 is arranged oriented, static, in the open position (A).

In the apparatus 100, the mechanical solution adopted consists of equipping each movable gate with two end fingers or bolts which are rotatably inserted in respective holes provided in the sides of the gas outlet duct, specifically in the gas outlet area 11 of the chamber 5. At least one of these fingers, or an integral component thereof, extends outside of the chamber 5 and is firmly attached outside of the chamber 5 to a transmission lever actuated, in the case of the lower 31 and the intermediate 32 gates, by the respective actuator 31*a*, 32*a*, in this case as a piston group. The transmission lever is attached in a hinged manner to the piston, such that the movement of the piston in one direction or the opposite one will ensure the rotation of the transmission lever and in turn, the rotation of the associated gate in a first direction or the opposite one. With reference to FIG.

4, which shows the gates 31, 32, 33 in the open position (A) thereof, the retraction of the piston groups of the actuators 31*a* and 32*a* will ensure the clockwise rotation of the respective transmission levers, rotating in turn the associated upper and intermediate gates 31 and 32, respectively, also clockwise into the closed position (B).

Note that a cascade arrangement of the upper 31 and the intermediate 32 gates from the open position (A) thereof to the closed position (B) thereof, starting with the one at the highest level and continuing with the one immediately below, causes a gradual reduction in the passage of gas and the concentration thereof towards a gradually lower area of the perforated wall 4 of the drum 3, consequently closing the passage of gas to the areas of the perforated wall 4 which will be uncovered in the event of working with successively smaller sizes of batches of articles.

The existence of apparatuses equipped with movable spraying nozzles enables the operators to add, as a recipe parameter, the position of the nozzles inside the drum. According to the nature of the articles to be coated and especially to the size of the batch of articles to be coated, the optimal position of the nozzles is known. This position can be known, for example, based on a table of experiments.

The nozzles can be positioned manually or automatically, according to the features offered by the apparatuses, and there are several known mechanisms for the movement thereof, there are those that allow linear movements, combined movements and even those that allow not only the placement of the nozzles in a desired position but the change in orientation thereof.

In any case, the position of the nozzles, as a recipe parameter, is directly related to the size of the batch of articles and the size of the batch of articles will determine how much smaller and more displaced towards the bottom of the drum will be the area of the perforated wall that will be effectively covered by the batch of articles during the rotation of the drum.

The apparatus 100 exemplifying the invention takes advantage of this knowledge and the controller 1 is able to operate the closure system 30 to automatically adjust the status thereof depending on the position of the nozzles 7. Alternatively, in simpler versions of the apparatus 100, the controller 1 can be equipped to trigger a recommendation signal 16 if the status of the closure system 30 is not optimal according to the position of the nozzles 7 so that the operator manually adjusts the status of the closure system 30.

In the apparatus 100 of FIG. 4 the dispenser group 6, assembling several spraying nozzles 7, has an associated mechanism 9 which enables the nozzles 7 to be arranged in a position selected inside the drum in an assisted manner. Specifically, the mechanism 9 is motorised and is controlled by a sensor 14 which detects, in real time, the distance (di) between a measurement point and the free surface 2*a* of the batch of articles 2 contained in the drum 3, thus equipping the dispenser group 6 with the ability to automatically arrange the nozzles 7, or correct the arrangement thereof, at a target distance (d0) from the free surface 2*a* of the batch of articles 2 inside the drum 3. The sensor 14 can be located in a fixed point or it can travel with the nozzles 7. A dispenser group of this type has been described, for example, in the patent document EP 3597048.

Examples of known sensors are mechanical transducers of the probe or remote measurement sensor type, for example, laser type, although those of the radar/sonar type are particularly preferred. One example of a sensor suitable for the implementation of this variant of the invention is the commercial radar sensor VEGAPULS 64, made available to the market by the company VEGA.

Figures 5, 6, 7:
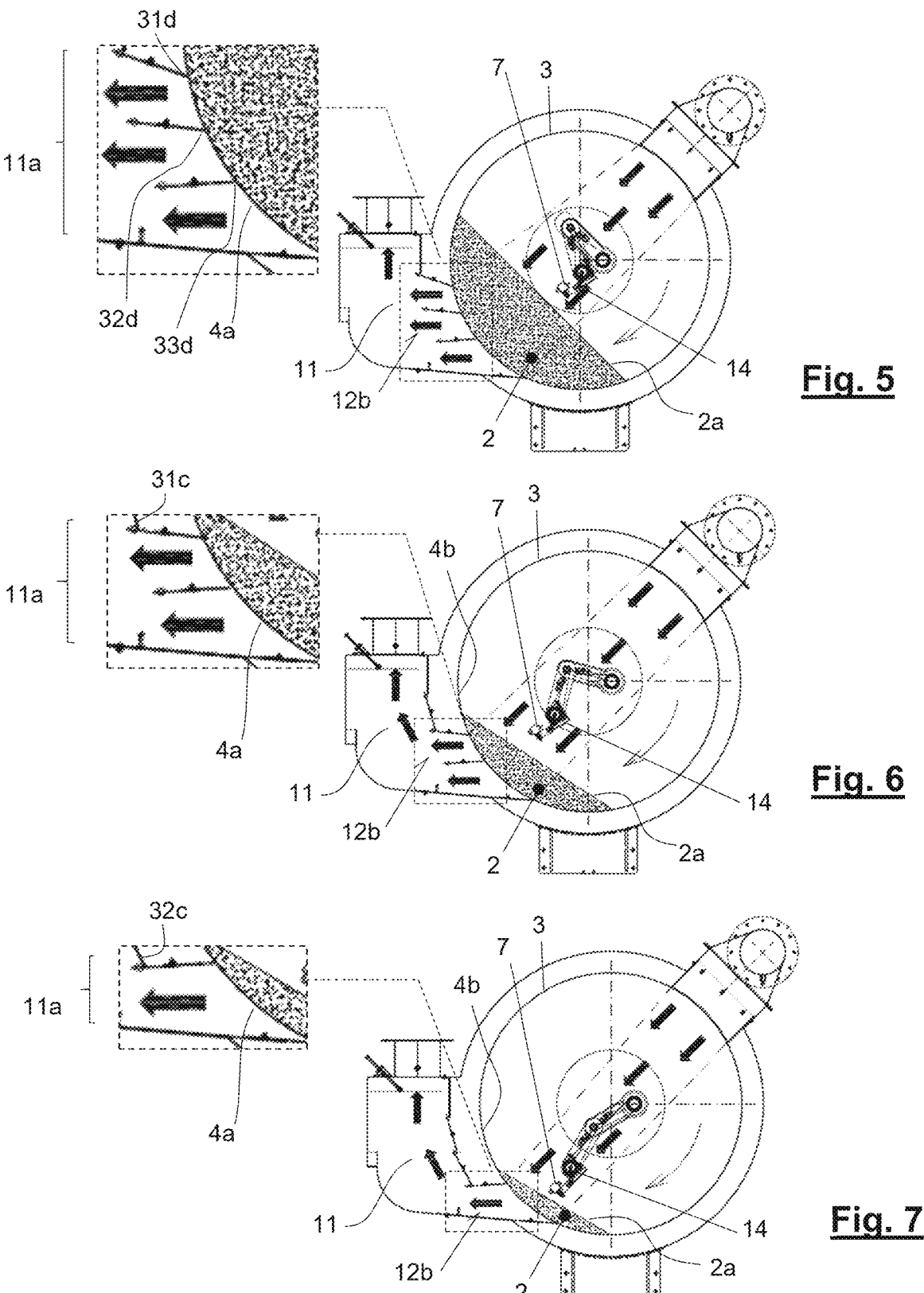
FIGS. 5 to 7 schematically show three operational situations in the same apparatus according to the invention operating with different sizes of batches of articles to be coated.

FIGS. 5 to 7 serve to illustrate the operation of this version of the apparatus 100 in the respective situations of maximum load, medium load and minimum load. In each case, one recipe parameter is the distance from the nozzles 7 to the free surface 2a of the batch of articles 2, these distances being able to be equal in value or different in each case.

FIG. 5 shows a situation of maximum load. The reading of the sensor 14 is used, in a manner known per se, to automatically position the nozzles 7 at the target distance (d0) from the free surface 2a of the batch of articles 2. The controller 1 (nor depicted) is programmed to relate the position adopted by the nozzles 7—close to the centre of the drum—to respect this target distance (d0) with respect to the free surface 2a of the batch of articles 2 in a maximum load scenario. In this maximum load scenario, the area 4a of the perforated wall 4 of the drum 3 which is effectively covered by the batch of articles 2 is such that no restriction of the dirty drying gas 12b outlet 11 is required. The controller 1 operates the closure system 30 accordingly so that both the upper and intermediate gates 31 and 32 respectively, adopt the open position (A) thereof.

FIG. 6 shows a situation of medium load. The reading of the sensor 14 is used, in a manner described above, to automatically position the nozzles 7 at a target distance (d0) from the free surface 2a of the batch of articles 2. Note that the position of the nozzles 7 differs from the one adopted in the maximum load scenario. The controller 1 (not depicted) relates this position of the nozzles 7 with a medium load scenario in which the area 4a of the perforated wall 4 of the drum 3 which is effectively covered by the batch of articles 2 is smaller than in the previous case, leaving an uncovered area 4b of the perforated wall 4 of the drum 3 facing the area of influence of the upper gate 31. In this case, a restriction of the dirty drying gas 12b outlet 11 and the definition of a smaller effective passage 11a (framed and enlarged area in the figure) to promote an outlet of dirty drying gas 12b through the batch of articles 2 is desirable. The controller 1 operates the closure system 30 accordingly so that the upper gate 31 adopts the closed position (B) thereof and so that the intermediate gate 32 adopts the open position (A) thereof.

FIG. 7 shows a situation of minimum load. The reading of the sensor 14 is used again to automatically position the nozzles 7 at a target distance (d0) from the free surface 2a of the batch of articles 2. The position of the nozzles 7 differs from the position they adopted in the maximum and medium load scenarios. The controller 1 (not depicted) relates this position of the nozzles 7 with a minimum load scenario in which the area 4a of the perforated wall 4 of the drum 3 which is effectively covered by the batch of articles 2 is even smaller than in the previous case, leaving an uncovered area 4b of the perforated wall 4 of the drum 3 facing the area of influence of the upper gates 31 and now also of the intermediate gate 32. In this case, an even greater restriction of the dirty drying gas 12b outlet 11 and the definition of a yet smaller effective passage 11a (framed and enlarged area in the figure) to promote an outlet of the dirty drying gas 12b desirably only through the batch of articles 2 is desirable. The controller 1 operates the closure system 30 accordingly so that both the upper 31 and intermediate 32 gates, adopt the closed position (B) thereof.

In order for the passage of gas to be effectively restricted and concentrated in the area of interest, in the apparatus 100 of the example, the dimensions of the upper 31, intermediate 32 and lower 33 gates are selected such that in the open position (A) the lower edge 31d, 32d, 33d of the blades making up said gates fit over the perforated wall 4 of the drum 3. In the example, the selected length of the blades measured from the rotation axis thereof is higher than the distance separating said rotation axis of the drum 3 such that there will be a determined angular position, which can differ slightly for each blade, in which this adjustment will take place. It is intended to hinder the passage of gas between the gap that may exist between the blades and the drum 3 when the gates adopt the open position (A) thereof.

It is possible to equip the lower edge 31d, 32d, 33d of the gates with sealing elements, by way of dynamic gaskets, although these sealing elements can be dispensed with. In practice, it has been verified that distances of approximately 5 mm do not alter the correct operation of the apparatus 100 nor do they significantly influence the redirection of the gas stream through the passage or passages enabled by the gates arranged in the open position (A) thereof.

In order for the closure of the passage of gas to be airtight, or essentially airtight, in the closed position (B) the upper 31c, 32c and lower 31d, 32d edges of the blades of the upper 31 and intermediate 32 actuatable gates fit over the respective adjacent frames or gates in an essentially airtight manner. In the example, the lower edges 31d and 32d of the blades of the upper 31 and intermediate 32 gates overlap the blades in the level immediately below.

In conventional apparatuses, even equipped with movable nozzles, it is possible to observe average losses from 30% to 20% of the coating product 8 suspended in the gas, which means that in specific recipes, the losses are greater. With the implementation of the apparatus 100, average losses are obtained of only 10% of the coating product 8 suspended in the gas.

The person skilled in the art will have acknowledged that other versions of the closure system 30 are possible, especially, that it is possible to reduce or increase the number of actuatable gates without the essence of the invention being affected.

As shall have been appreciated, the closure system 30 exemplified by FIGS. 4 to 7 gives the apparatus 100 a discreet adjusting ability of the passage of gas through the outlet 11 as far as the concentration thereof towards lower areas of the drum 3 is concerned. In fact, the closure system 30 based on several gates is intended to be operated such that the actuatable gates adopt any one of the end open (A) or closed (B) positions thereof but not an intermediate position. This leads to, in the example, three concentration levels of the passage of gas and every time to a lower area of the perforated wall 4 of the drum 3.

Other options are, however, possible.

Figure 8:
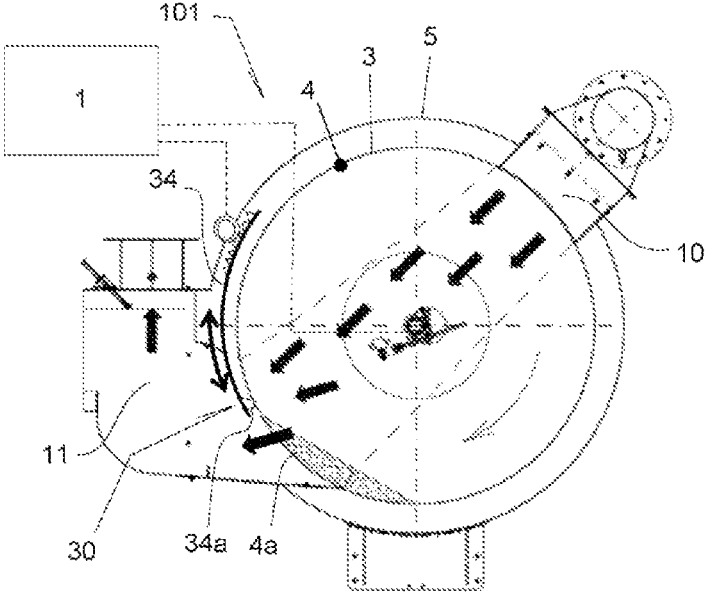
FIG. 8 schematically shows another apparatus according to the present invention.

The apparatus 101 of FIG. 8 exemplifies an alternative variant of the invention with a continuous adjusting ability of the passage of gas.

A feature of the apparatus 101 is that it comprises an adjustable closure system 30 interposed between the drum 3 and the gas outlet 11 of the chamber 5 with a single movable gate 34, for example, guillotine type, which can be moved downwards to further seal the gas outlet 11 of the chamber 5. Preferably, the single gate 34 will have a circumferential arch shape and is arranged coaxial with the drum 3. The single gate 34 will assemble, preferably, a sealing element such as a dynamic sealing gasket 34*a* to hinder the passage of gas between the gap determined between the single gate 34 and the perforated wall 4 of the drum 3.

Rack and pinion units, gears, bearings, guides, etc. may be required for the actuation of the single gate 34 and for the guided movement thereof.

Although this single-gate solution may not be suitable for the coating of pharmaceutical articles, the processes and machinery of which require compliance with specific regulations of strict compliance for drug manufacturers, and we mean, for example, the requirements of the industry in terms of FDA/BGA regulations, as well as the demands for reliability, accuracy, hygiene and quality required by the pharmaceutical industry, the variant of apparatus 101 in FIG. 8 may be of interest for other industrial applications which do not require as many procedural demands.

The invention claimed is:

1. An apparatus for coating or encapsulating articles, comprising a drum with a perforated wall rotatably mounted in a wrap-around chamber, the drum being suitable for containing and removing a batch of articles to be coated during the rotation of the drum; a dispenser group with at least one nozzle for spraying a coating product on the articles contained in the drum; at least one gas inlet to the chamber on a first side of the drum to direct clean drying gas against the perforated wall of the drum and at least one gas outlet from the chamber to the other side of the drum, adjacent to the perforated wall of the drum to extract from the chamber dirty drying gas that has passed through the drum, the apparatus comprises a closure system that is adjustable and interposed between the drum and the at least one gas outlet of the chamber, capable of defining an effective passage for the dirty drying gas smaller than the passage offered by the gas outlet of the chamber and corresponding to an area of the perforated wall of the drum that is effectively covered by the batch of articles;

wherein the apparatus further comprises, downstream of the chamber, a drying gas suction group, capable of providing vacuum conditions in the chamber and consequently promoting a flow of dirty drying gas in one outlet direction of the chamber; and wherein the closure system comprises moveable gates placed across the passage of gas, superimposed and configured in the form of blades which, like a slatted shutter, are rotatably assembled around respective rotation axes essentially normal to the direction, with more than one of moveable gates actuatable between at least one open position, wherein the corresponding blade is arranged essentially parallel to the direction, and a closed position, wherein the corresponding blade is essentially normal to the direction, so that a cascade arrangement of the moveable gates from the open position to the closed position, starting with the one at the highest level and continuing with the one immediately below, causes a gradual reduction in the passage of gas and the concentration thereof towards lower positions of the perforated wall of the drum.

2. The apparatus according to claim 1, comprising a controller which operates the closure system for at least automatically adjusting the status thereof or triggering a recommendation signal, if the status of the closure system is not optimal or is not in concordance with the area of the perforated wall of the drum that is effectively covered by the batch of articles.

3. The apparatus according to claim 2, wherein the dispenser group has an associated mechanism which enables the at least one nozzle to be moved and arranged in a selected position inside the drum; and wherein a size of the area of the perforated wall of the drum which is effectively covered by the batch of articles is estimated based on the instantaneous position of the at least one nozzle inside the drum.

4. The apparatus according to claim 3, equipped with a sensor which measures the distance between a measurement point and the free surface of the batch of articles contained in the drum, and in that the mechanism of the dispenser group is a motorised mechanism, controlled based on the measurement of the sensor, thus equipping the aforementioned dispenser group with the ability to automatically position the at least one nozzle inside the drum at a target distance with respect to the free surface of the batch of articles which will in turn trigger, by means of the controller, the adjustment, also automatic, of the status of the closure system.

5. The apparatus according to claim 2, equipped with a sensor which measures a distance between a measurement point and the free surface of the batch of articles contained in the drum and a size of the area of the perforated wall of the drum that is effectively covered by the batch of articles is estimated based on the measurement by the sensor.

6. The apparatus, according to claim 2, wherein the movable gates are configured to be actuated by respective actuators, controllable by the controller.

7. The apparatus, according to claim 6, wherein the moveable gates are actuatable by the controller between at least the open position and the closed position.

8. The apparatus, according to claim 7, wherein in the open position a lower edge of the blades of the movable gates fits over the perforated wall of the drum.

9. The apparatus, according to claim 7, wherein in the closed position upper and lower edges of the blades of the gates fit over respective adjacent frames or respective ones of the gates in an essentially airtight manner.

10. An apparatus for coating or encapsulating articles, comprising a drum with a perforated wall rotatably mounted in a wrap-around chamber, the drum being suitable for containing and removing a batch of articles to be coated during the rotation of the drum; a dispenser group with at least one nozzle for spraying a coating product on the articles contained in the drum; at least one gas inlet to the chamber on a first side of the drum to direct clean drying gas against the perforated wall of the drum and at least one gas outlet from the chamber to the other side of the drum, adjacent to the perforated wall of the drum to extract from the chamber dirty drying gas that has passed through the drum, the apparatus comprises a closure system that is adjustable and controlled by a controller, the closure system is interposed between the drum and the at least one gas outlet of the chamber, the closure system defines an effective passage for the dirty drying gas smaller than the passage offered by the gas outlet of the chamber and corresponding to an area of the perforated wall of the drum that is effectively covered by the batch of articles so that flow of the dirty drying gas is concentrated at the area of the perforated wall of the drum that is effectively covered by the batch of articles; and wherein, in order to control the closure system, the controller is configured to automatically adjust the status of the closure system or trigger a recommendation signal, if the status of the closure system is not in concordance with the area of the perforated wall of the drum that is effectively covered by the batch of articles;

wherein the dispenser group has an associated mechanism that enables the at least one nozzle to be moved and arranged in a selected position inside the drum; and wherein a size of the area of the perforated wall of the drum which is effectively covered by the batch of articles is estimated based on the instantaneous position of the at least one nozzle inside the drum and a signal corresponding to the instantaneous position of the at least one nozzle is received by the controller to determine whether the status of the closure system is not in concordance with the area of the perforated wall of the drum that is effectively covered by the batch of articles.

11. An apparatus for coating or encapsulating articles, comprising a drum with a perforated wall rotatably mounted in a wrap-around chamber, the drum being suitable for containing and removing a batch of articles to be coated during the rotation of the drum; a dispenser group with at least one nozzle for spraying a coating product on the articles contained in the drum; at least one gas inlet to the chamber on a first side of the drum to direct clean drying gas against the perforated wall of the drum and at least one gas outlet from the chamber to the other side of the drum, adjacent to the perforated wall of the drum to extract from the chamber dirty drying gas that has passed through the drum, the apparatus comprises a closure system that is adjustable and controlled by a controller, the closure system is interposed between the drum and the at least one gas outlet of the chamber, the closure system defines an effective passage for the dirty drying gas smaller than the passage offered by the gas outlet of the chamber and corresponding to an area of the perforated wall of the drum that is effectively covered by the batch of articles so that flow of the dirty drying gas is concentrated at the area of the perforated wall of the drum that is effectively covered by the batch of articles; and wherein, in order to control the closure system, the controller is configured to automatically adjust the status of the closure system or trigger a recommendation signal, if the status of the closure system is not in concordance with the area of the perforated wall of the drum that is effectively covered by the batch of articles; and wherein the apparatus is equipped with a sensor that measures a distance between a measurement point and the free surface of the batch of articles contained in the drum and a size of the area of the perforated wall of the drum that is effectively covered by the batch of articles is estimated based on the measurement by the sensor, and wherein a corresponding signal from the sensor is received by the controller to determine whether the status of the closure system not in concordance with the area of the perforated wall of the drum that is effectively covered by the batch of articles.

12. The apparatus according to claim 2, wherein the closure system is adjustable so as to resize the effective passage based on the area of the perforated wall of the drum that is effectively covered by the batch of articles while maintaining the effective passage coinciding with or overlapping the area of the perforated wall of the drum that is effectively covered by the batch of article.

13. The apparatus according to claim 10, wherein the closure system is adjustable so as to resize the effective passage based on the area of the perforated wall of the drum that is effectively covered by the batch of articles while maintaining the effective passage coinciding with or overlapping the area of the perforated wall of the drum that is effectively covered by the batch of article.

14. The apparatus according to claim 11, wherein the closure system is adjustable so as to resize the effective passage based on the area of the perforated wall of the drum that is effectively covered by the batch of articles while maintaining the effective passage coinciding with or overlapping the area of the perforated wall of the drum that is effectively covered by the batch of article.

15. The apparatus according to claim 11, wherein the sensor is configured to measure the distance between the measurement point and the free surface of the batch of articles contained in the drum while the at least one nozzle sprays the coating product on the articles.

* * * * *